Oct. 21, 1969   C. V. OHRBERG   3,473,437
ROTARY SLIDE VALVE FOR FLUID MOTORS AND PUMPS
Filed July 17, 1967

United States Patent Office 3,473,437
Patented Oct. 21, 1969

3,473,437
ROTARY SLIDE VALVE FOR FLUID
MOTORS AND PUMPS
Carl V. Ohrberg, Nordborg, Denmark, assignor to Danfoss A/S, Nordborg, Denmark, a company of Denmark
Filed July 17, 1967, Ser. No. 653,875
Claims priority, application Germany, July 19, 1966,
D 50,617
Int. Cl. F01c 1/04
U.S. Cl. 91—56                                   18 Claims

ABSTRACT OF THE DISCLOSURE

Commutator valve for fluid motors and pumps comprising a multiported rotary driven slide valve on a rotor and a multiported housing for the slide valve functioning as the valve plate formed on the stator. The two valve elements control passage of volumes or quantities of liquid effected through ports or concavities in the slide valve to ports in the stator and/or vice versa without excessively rapid changes in pressure occurring during passage through the commutator valve. There is, of course, a pressure differential across the valve. The elimination of sharp changes in pressure avoids pressure surges in the output of a fluid pump provided with the commutator and eliminates mechanical shocks along the shaft on a fluid motor provided with the commutator valve. Silent and smooth operation is accomplished by passage of a small quantity of liquid under pressure, in a progressively increasing small volume, of each principal quantity flow or passage between the slide valve ports and distributor ports in the housing immediately before passage of the principal volume or quantity from one port to the other.

---

This invention relates generally to hydraulic or fluid motors and pumps and more particularly to a new and improved distributor or commutator valve comprising a rotary driven slide valve assembly for use on such fluid motors and pumps.

Rotary apparatus operable as a hydraulic motor or a pump are known in which liquid distribution is accomplished between a rotor comprising a rotary driven slide valve and a stator or housing for the slide valve acting as a valve plate of the apparatus. The rotary slide valve effects passage of discrete quantities of liquid from ports or concavities therein to ports of the stator or vice versa. The flow is controlled so that the individual passages through the ports is successive so that a continuous flow is maintained and the rotary apparatus functions continuously. Usually there is a pressure differential between the ports. Rotary slide valve systems of this kind are generally applied to meshing disc piston machines, which function as pumps or motors, in which positive displacement cells to which the liquid is delivered, are formed in the spaces between the teeth of an outer gear ring and the teeth of an inner gear ring having one tooth less than the outer ring. Hydraulic fluid is delivered from the rotary slide distributor valve arrangement to the positive displacement cells formed between the teeth for operating the rotary apparatus as a pump and if the rotary slide valve revolves at the speed at which the center of gravity' of the inner gear revolves then one large orifice for fluid at high pressure and one large orifice for fluid at low pressure is sufficient. If on the other hand the rotary slide valve revolves at the speed of the inner gear wheel then the number of orifices or ports required for the fluid at high pressure corresponds to the number of teeth of the inner gear wheel and the same applies to the number of orifices or ports required for the fluid at low pressure. These orifices or ports are preferably provided on a rotary slide valve. However, the two types of orifices may also be provided on two different elements of the commutator valve.

In rotary slide valve assemblies of this type a problem arises in that a sudden change of pressure occurs when the slide valve ports begin to align with the leading edge of respective distribution ports of the stator or valve plate and a flow path is established from a higher pressure to a lower pressure. This sudden change manifests itself, as pressure surges, in the hydraulic system when the rotary apparatus, provided with the valve, is operating as a pump and if the rotary apparatus is operating as a motor the rapid changes of pressure are detected as mechanical shocks of short duration at the shaft.

A principal object of the present invention is to provide a slide valve assembly for rotary hydraulic apparatus capable of avoiding generation of mechanical shocks in the apparatus and pressure pulsations or surges in a hydraulic system to which the rotary hydraulic pressure apparatus is connected and delivering an outflow.

It has been found that the shocks developed when the leading edge of the distribution inlet orifices or ports align themselves with the stationary distribution orifices or ports is due to the fact that almost the full pressure becomes suddenly effective in the positive displacement cells or spaces between the toothed drive elements of the apparatus when functioning as a motor. On the other hand if the apparatus is taking a suction and functioning as a pump the distribution orifices in aligning themselves allow the pressure generated in the positive displacement cells or spaces between the teeth of the gears to be suddenly transmitted to the hydraulic system exteriorly of the rotary apparatus or pump.

A feature of the invention is the provision of means for flowing a small quantity of liquid progressively increasing in volume in the exchange between orifices before the principal volume or quantity is transmitted from one orifice to the other. This is accomplished by short-circuiting a minute quantity of liquid between the supply and discharge orifices or ports through provision of a bypass duct in the leading edge of a supply orifice.

The bypass ducts need only bypass very minute quantities of hydraulic fluid to attenuate the sudden change of pressure that would result otherwise. Their cross section is so small that they produce a throttling effect so that the amount of fluid bypassed by the rotary distributor or commutator slide valve remains negligible.

The bypass ducts are provided on high pressure orifices as an extension thereof in a circumferential direction on a leading edge thereof. This is particularly applicable to unidirectional apparatus used either as a motor or pump. In bi-directional apparatus which can function either as a motor or as a pump some of the orifices, namely the discharge orifices when operating in one direction and which become supply ports or orifices in reverse operation, have bypass ducts on a trailing edge thereof which operates as the leading edge of the ports in reverse operation. The trailing edge is, therefore, in effect a leading edge due to the relative relationship of the ports upon reverse rotation.

The bypass ducts establish a preliminary communication between the orifices or ports before the main portion of the orifices are brought into alignment. Since they are constructed as circumferentially directed extensions of the orifices the end thereof in communication with the principal orifice opening is wider than at the termination of the ducts which decreases in dimension in a circumferential direction so that the cross section thereof is triangular in configuration. In this way steep pressure rises or changes are replaced by a gradual transition in pressure between the registering orifices or ports.

Other features and advantages of the commutator valve or slide valve system in accordance with the present invention will be better understood as described in the following specification and appended claims in conjunction with the following drawings in which:

While the commutator valve according to the invention will be described as applied to rotary apparatus or pressure fluid devices constituting a fluid motor it is equally applicable to fluid pumps. Moreover, the fluid motors may likewise operate as pumps and may be operable in one direction only or fully reversible.

The terms orifice and port used herein are used as equivalents meaning an opening for inlet or outlet of a fluid. Moreover, the term port means a passageway having length thereto. The term passage is used to mean the act of passing or transit from one place to another and may also be used to mean passageway or port depending upon the context in which it is used.

Figure 1:
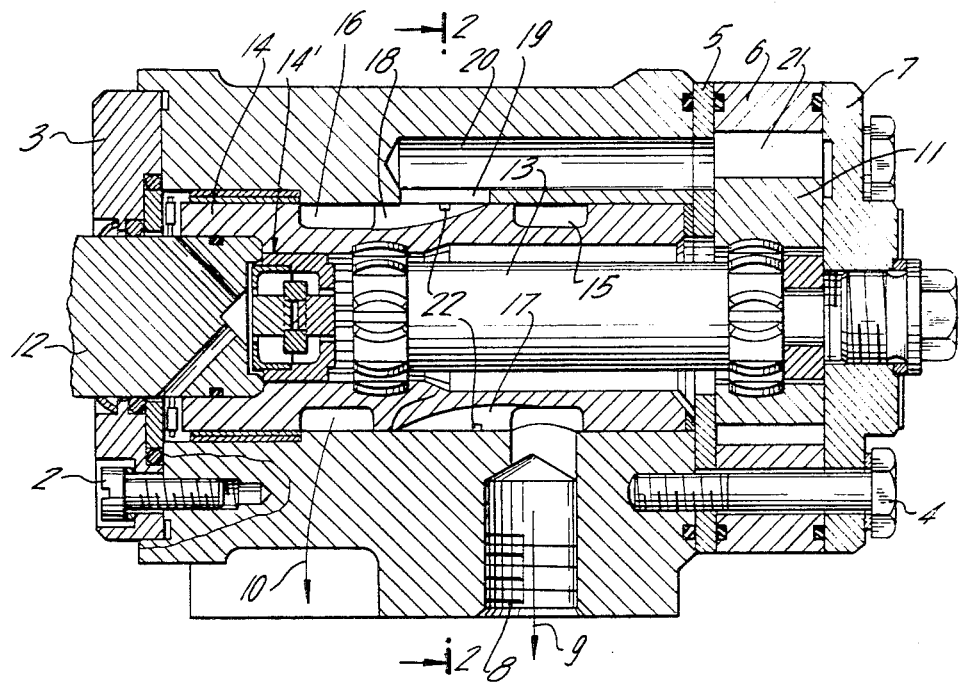
FIG. 1 is a longitudinal section view of a fluid pressure rotary apparatus provided with a commutator valve according to the invention.

As illustrated in FIG. 1 the rotary apparatus has a stator comprising a casing or housing 1 closed at one end with an end cover 3 secured by circumferentially spaced screws 2 and provided with an intermediate plate 5 mounted by screws 4 likewise mounting an end cover or plate 7 at the opposite end of the stator. Intermediate the end cover 7 and the plate 5 is disposed, as part of the stator, a gear ring 6 having internal gear teeth or lobes which are stationary. The stationary gear defines the outer walls of a chamber formed therein.

The housing 1 is provided with an inlet 8 for supplying a flow of hydraulic fluid illustrated by an arrow 9 and is provided with an outlet, not shown, for the discharge or return flow illustrated by an arrow 10.

A gear 11, as part of a rotor of the machine, is mounted in the chamber formed by the outer gear coaxial with the stator outer ring gear 6 and has its teeth or lobes meshing with the teeth or lobes of the gear ring 6. The inner gear 11 has one tooth or lobe less than the outer gear ring and has superimposed thereon its own rotary movement an orbital movement within the outer gear. That is to say its center of gravity moves in a closed circular or orbital path about the axis of the outer gear while the inner gear rotates in order for the two gears to cooperate in development therebetween chambers or spaces between the teeth or lobes so that the apparatus can function either as a motor or as a pump. An output shaft 12 is operably connected to a shaft 13 connected to the inner gear 11. The two shafts are connected by a multiported rotary driven slide valve 14 having a circumferential groove 15 constantly in communication with the inlet 8 for receiving fluid from a source of fluid pressure not shown.

The rotary slide valve 14 is a tubular valve element housed within a bore of the stator for rotation and acts as a coupling or link between the shafts. It is provided with an axial recess in which the shaft 12 is received and positively connected thereto, for example by welding. The shaft 13 extends axially internally of the tubular rotary slide valve 14 and is coupled to the inner gear 6 and the sleeve slide valve 14 by crowned involute splines or teeth longitudinally arcuate as shown to permit rocking or tilting movements so that the shaft 13 is able to allow for or compensate for the orbital movement of the inner gear. The inner gear rolls in the outer gear and this type of compensating connection and gear operation is of the type shown in United States Patent 2,821,171 granted to Charlson on Jan. 28, 1958.

Within the valve element 14 is housed a combination centrifugal and magnetic separator 14' described in detail in my copending application Ser. No. 654,213 filed July 18, 1967. This separator is in the path of leakage fluid flow through element 14 and has a housing defining a centrifugal separation chamber for solid contaminants within which is housed a magnet acting as a magnetic separator for metallic contaminants in the fluid and abraded from the working parts. The fluid enters through axial openings in the separator housing and exits through axial outlets and lubricates the journal of the output shaft 12.

The rotary slide valve 14 is provided with two circumferential grooves 15, 16 axially spaced from each other and in communication with the inlet 8 and outlet respectively of the housing 1. These circumferential grooves 15, 16 are constantly in communication with the fluid inlet and the outlet.

The slide valve 14 is provided circumferentially thereof with axially extending ports or passageways formed as concavities or grooves 17 which are spaced angularly or circumferentially relative to each other and have one end open and communicating with the circumferential groove 15. These axial grooves are arcuately constructed as illustrated in the drawing and are open to the periphery of the slide valve 14 and closed at the end opposite to the closed end. A second plurality of ports formed as concavities or arcuate grooves 18 alternating with the grooves 17 are disposed circumferentially angularly spaced on the rotary slide. The grooves 18 communicate with the circumferential groove 16 and likewise have one end closed. The number of grooves 17, 18 in each plurality of grooves correspond to the number of teeth of the inner gear 11.

The casing or stator 1 is disposed circumferentially of the slide valve 14 and defines a multiported valve plate provided with orifices or openings 19 which communicate with ports or passageways 20 extending axially of the casing generally in the same axial direction as the grooves. These axial passages 20 communicate with the spaces 21 formed between the adjacent teeth of the gear rings that define the activating cells or chambers subjected to pressure fluid. Half of these spaces are subjected to fluid pressure and the opposed half is connected to a return line or outlet under control of the commutating valve, i.e., the slide valve 14 and the valve plate or stator 1. The positive displacement cells or spaces 21 formed between the teeth of the stationary outer gear ring 6 and those of the inner orbital gear 11 are alternately connected to the inlet 8 and the outlet 10 through the passageways 20 and the two pluralities of axial grooves defining the orifices or ports of the commutating valve arrangement.

It will be seen that if fluid under perssure is provided at the inlet 8 the inner gear 11 is driven rotationally and the apparatus operates as a motor delivering an output torque through shaft 12. Conversely if the shaft 12 is rotatably driven as an input shaft the apparatus can take a suction through the discharge opening, not shown, so that the apparatus will function as a pump discharging through the inlet 8. In which case the second plurality of orifices are the high pressure orifices and the first plurality are at a lower pressure and function as the discharge orifices.

In the present embodiment illustrated the apparatus is functioning as a motor and the axial groove 17 are high pressure orifices and the axial grooves 18 are low pressure orifices. These ports or orifices coincide or are in registry alternately with the distribution ports 19 formed in the casing 1. As relative rotation takes place between the rotary slide valve and the housing or stator the high and low pressure ports are brought into opposed positions of registry with the distribution ports 19 so that flow takes place between the inlet, the driven gear and the discharge outlet. It being understood, of course, that rotation of the inner gear is effected by the pressure fluid delivered to the opened spaces between the gear teeth causing the apparatus to function as a motor. The pressure chamber or spaces become return chambers which close for returning or discharging the fluid as the inner gear rotates.

In order to avoid the aforementioned high pressure rapid changes between the orifices or ports, which have differential pressures therebetween, resulting in mechanical shocks and hydraulic rapid changes or pressure changes the invention is provided with a plurality of bypass ducts 22. The bypass ducts 22 extend in a circumferential direction and axially on one side edge of the respective orifices or grooves 17, 18. In the instant case the direction of rotation of the rotary slide valve 14 is assumed to be counterclockwise and the grooves or ports 17 functioning as the high pressure ports have the ducts 22 on a leading edge thereof while the low pressure ports 18 have them on a trailing edge thereof, FIG. 2. Since the motor is fully reversible the trailing edge of the ports 18 is the leading edge thereof when rotation is in an opposite direction and the bypass ducts on the ports 18 are then fully effective. The cross section of the bypass ducts 22 is very small. Due to the tetrahedral shape of these bypass ducts the resulting cross section is triangular defining a pyramidal extension of the cross section of the principal port in the direction towards the adjacent port 17 or 18.

Figure 2:
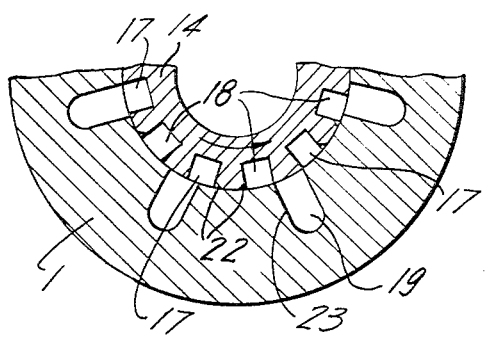
FIG. 2 is a fragmentary cross section view taken on section line 2—2 of FIG. 1.
Figure 3:
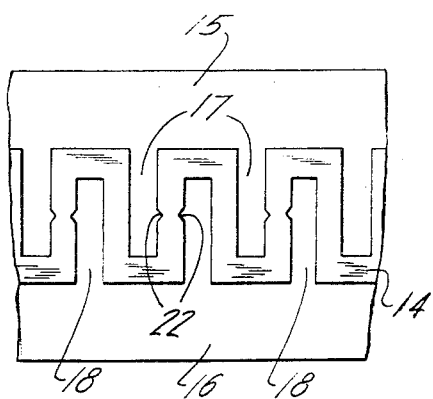
FIG. 3 is a fragmentary developed view of a part of FIGS. 1 and 2 illustrating a rotary slide valve according to the invention.

As illustrated in FIG. 2 assuming that the sense of rotation of the rotary slide valve 14 is counterclockwise as indicated in the drawing by the arrow the high pressure orifices or ports 17 are illustrated in communication with the stator ports 19 and with one of them interrupting communication therewith and a third is closed off by the inner bore of the casing 1. As rotation continues the port or groove 17 shown in a closed condition begins to communicate with a distribution port 19. However, since the bypass ducts on the high pressure ports are on the leading edge the respective bypass duct will allow a small quantity of fluid, progressively increasing in volume and part of the principal flow making passage between the ports, to flow between the orifices or ports before the main leading edges of the orifices are in registry. That is as soon as the first edge 23 of the orifice 19 is passed by a leading bypass duct 22 the small flow of liquid exchanged through a bypass duct will attenuate the sudden change of pressure that would otherwise occur as the ports progressively assume registry angularly.

It can be seen that if the external connections to the apparatus are interchanged, i.e., the fluid is supplied at the discharge 10 and discharge at the outlet 9, then the axial grooves or ports 18 will become the high pressure orifices and the rotary slide valve will revolve in the opposite direction. In this case the bypass ducts 22 provided on the axial grooves 18 will be provided at a leading edge thereof and will function as heretofore described.

It will be understood that the bypass ducts may be provided on the distribution ports 19. In motors or pumps rotating in only one direction the bypass ducts 22 need be provided only on the high pressure ports 17.

Instead of the disc piston engine illustrated in the drawing the rotary commutating valve arrangement may also be employed for other types of revolving-piston engines such as rotary piston engine etc. in which case positive-displacement chambers have to be connected to high pressure ports at certain intervals of time. If bypass ducts are provided on either side edge of the orifices or ports 17 and 18 it will also be possible somewhat to attenuate the sudden change of pressure which occurs upon closure of the distribution ports 19.

While a preferred embodiment of the invention has been shown and described it will be understood that many modifications and changes can be made within the true spirit and scope of the invention.

What I claim and desire to be secured by Letters Patent is:

1. In a rotary hydraulic apparatus, a rotary driven multiported slide valve, a multiported valve plate comprising a plurality of ports relative to which ports of said slide valve are successively positioned in opposed positions in registry for flow of liquid between ports of said slide valve and said valve plate, means including said valve plate for flowing liquid between the ports of said multiported slide valve and said multiported valve plate when the ports thereof are opposed in registry, and bypass means to progressively flow in progressively increasing volume small initial discrete quantities of liquid between individual ports of said slide valve and respective ports of said valve plate before said individual ports are disposed in partial registry and before flowing immediately thereafter the principal volume of liquid flow between individually opposed ports in registry of said slide valve and said valve plate thereby to cause said apparatus to operate free of mechanical shocks of short duration when said opposed ports are in registry and without surges in pressure in the flow of liquid flowing between the individual opposed ports of said slide valve and valve plate due to their positions of registry.

2. In a rotary hydraulic apparatus according to claim 1, in which said slide valve comprises a cylindrical valve, said ports thereon comprising a plurality of concavities disposed spaced circumferentially of said cylindrical valve and open to the periphery of said cylindrical valve, said valve plate comprising a housing disposed circumferentially of said cylindrical valve and having a bore within which said cylindrical valve is disposed for rotation, said ports on said housing being open to the bore, and said means for flowing liquid between the ports of said cylindrical valve and said housing comprising a circumferential groove continuously in communication with said concavities, and means to flow liquid under pressure to said circumferential groove during operation of said apparatus.

3. In a rotary apparatus according to claim 2, in which said means to progressively flow in progressively increasing volume small discrete quantities of liquid, comprising means defining bypasses from individual ports of said slide valve to the ports of said valve plate rendered effective to flow liquid between the ports of said slide valve and the ports of said valve plate before the overlap in partial registry, and said bypasses being configured to be ineffective when said ports of said valve plate are spaced a given angular extent relative to ports of said valve plate.

4. In a rotary machine, a driven rotary multiported slide valve, comprising a first plurality of ports and a separate second plurality of ports, means comprising a third plurality of ports relative to which said slide valve is driven rotationally and the ports of said slide valve assume opposed positions relative to the ports of said third plurality of ports for flow of a fluid therebetween, means in communication with one of said pluralities of ports of said slide valve to deliver during rotation of said slide valve a fluid under pressure to said one of the pluralities of ports in said slide valve for flow therethrough to said third plurality of ports and flowing in reverse direction through said third plurality of ports to the other plurality of ports in said slide valve when the ports of said slide valve are in opposed positions to the ports of said third plurality of ports, means to preclude a sudden change in fluid pressure within said ports when said ports assume opposed positions of partial registry comprising bypass means to progressively flow in progressively increasing volume a small discrete quantity of fluid between the individual ports effecting a flow of fluid therebetween before a principal volume of fluid flow is effected between the ports immediately thereafter when said ports are partially opposed and in complete registry, and means in communication with said other plurality of ports of said slide valve to deliver an outflow of fluid from said apparatus to a fluid system, whereby the apparatus operates without successive mechanical shocks of short duration due to flow of fluid between said ports and without surges of pressure in the fluid outflow of said apparatus.

5. In a rotary hydraulic machine having a driven rotor and a stationary stator, said rotor comprising a driven rotary slide valve having a first plurality of concavities angularly spaced on said slide valve and ported to the surface of said slide valve, said stator having a second plurality of ports for communication with said first plurality of concavities individually successively when in opposed positions in angular registry therewith upon rotation of said slide valve, said ports being angularly spaced on said stator, means to provide liquid under pressure to said first plurality of concavities for passage therefrom to the second plurality of ports when said first plurality of concavities are in registry with said ports, and means to preclude a sudden change in liquid pressure within individual ports and concavities when said individual concavities initially assume opposed angular positions of registry with individual ones of said ports comprising bypass means to progressively flow in progressively increasing volume a small discrete quantity of liquid between the individual concavities and ports effecting an exchange of discrete quantities of liquid therebetween when assuming said opposed angular positions of registry before a principal volume of said discrete quantities of liquid are immediately thereafter delivered between said concavities and ports exchanging liquid therebetween, and means to deliver a hydraulic outflow from said apparatus, whereby the apparatus operates without successive mechanical shocks of short duration due to flow of liquid between said concavities and ports and without rapid changes of pressure in the hydraulic outflow of said apparatus.

6. In a rotary hydraulic machine having a driven rotor and a stationary stator, said rotor comprising means having a first plurality of ports angularly spaced peripherally on said rotor and open to the surface of said rotor, said stator having a second plurality of ports each opening for communication with said first plurality of ports individually and successively when in opposed positions in angular registry therewith upon rotation of said rotor, said ports being angularly spaced on said stator, means to provide liquid under pressure to one of said pluralities of ports for passage therefrom to the other of said pluralities of said ports when said ports are in registry, and means to preclude a sudden change in liquid pressures within individual ports of the other of said pluralities of ports when initially assuming opposed positions of registry with individual ports of said one of said pluralities of ports comprising bypass means to progressively flow in progressively increasing volume a small discrete quantity of liquid between the individual ports effecting passage of liquid therebetween before assuming said opposed positions of registry and before passage of the principal volume of liquid immediately thereafter between said ports effecting passage of liquid therebetween, and means to deliver a hydraulic outflow from the other of said pluralities of ports, whereby the apparatus operates without successive mechanical shocks of short duration due to said passage of liquid and without rapid changes of pressure in the hydraulic outflow of said apparatus.

7. In a rotary hydraulic machine having a driven rotor provided with a first plurality of elongated grooves extending axially thereon, said grooves being disposed angularly spaced circumferentially of said rotor opening to the periphery of said rotor, a stator circumferentially of said rotor having a first plurality of axially extending passageways angularly spaced within said stator comprising ports, means to deliver a liquid under pressure to said grooves for delivery therefrom to said ported passageways when individual ones of said grooves are in registry with individual ones of said ports, and means to preclude a sudden change in pressure in said passageways when said grooves are brought into registry with said ports comprising bypass means to flow small discrete quantities of liquid between the individual grooves to the individual ports only before the individual grooves and ports are in registry.

8. In a rotary hydraulic machine according to claim 7, in which said rotor comprises a rotary elongated tubular slide valve in said stator having said grooves thereon, an input shaft and an output shaft connected to said rotary slide valve coaxially therewith for joint rotation.

9. In a rotary hydraulic machine according to claim 8, in which said input shaft and said output shaft extend axially into said slide valve and means connecting both shafts to said slide valve.

10. In a rotary hydraulic machine according to claim 3, in which said rotary slide valve is provided with a circumferential groove in communication with one end of each of said grooves, each groove having another end closed, said means to deliver a liquid under pressure comprising said circumferential groove and means to supply liquid to said groove.

11. In a rotary hydraulic machine according to claim 9, in which each groove has an arcuate configuration and in which each port is in axial registry with each of said grooves adjacent the closed end thereof.

12. In a rotary hydraulic machine according to claim 7, in which bypass means to flow small discrete quantities of liquid comprises by-pass ducts for each groove disposed as circumferential extensions of the individual ducts.

13. In a rotary hydraulic machine according to claim 12, in which said by-pass ducts have a small cross section and decrease in cross section in a circumferential direction.

14. In a rotary hydraulic machine according to claim 13, in which each groove has a by-pass duct along a leading edge thereof.

15. In a rotary hydraulic machine according to claim 13, in which some of the grooves have a by-pass duct along a leading edge thereof and others a by-pass duct along a trailing edge thereof.

16. In a fluid pressure operated motor, an internally toothed member defining the outer wall of a chamber, a cooperating externally toothed member having a less number of teeth than the internally toothed member and disposed eccentric thereof in said chamber in meshing engagement therewith, one of said members being movable in an orbit about the axis of the other thereof to produce relative rotation between said members, a pair of cooperating relatively movable valve elements one of which is coupled to said internally toothed member and which defines fluid passages communicating with said chamber, the other of said valve elements defining fluid passages communicating with different ones of the fluid passage in said one of the valve elements upon relative movement therebetween, one of said valve elements further defining inlet and outlet ports communicating with the fluid passages therein and adapted to be coupled to a source of fluid pressure, means operatively coupling said externally toothed member to a cooperating one of said valve elements to cause relative rotation between said valve elements responsive to said relative orbital movement between said toothed members, and one of said valve elements having means defining a by-pass duct for each inlet port allowing communication between the individual ports and the fluid passages upon relative movement of said valve elements effective to allow flow of a small quantity of pressure fluid between the ports and passages preliminarily to flow of a principal flow therebetween, and flow of said small quantity being effective to preclude pressure surges of fluid in said passages.

17. In a fluid pressure operated motor, an internally toothed member defining the outer wall of a chamber, a cooperating externally toothed member having a less number of teeth than the internally toothed member and disposed eccentric thereof in said chamber in meshing engagement therewith, one of said members being relatively stationary, the other thereof being relatively movable in an orbit about the axis of said one thereof to produce relative rotation between said members, a relatively stationary valve element and a relatively movable valve element one of which is coupled to said internally toothed member and which defines fluid passages communicating with said chamber, the other of said valve elements defining fluid passages communicating with different ones of the fluid passages in said one of the valve elements upon relative movement therebetween, one of said valve elements further defining inlet and outlet ports communicating with the fluid passages therein and adapted to be coupled to a source of fluid pressure, means operatively coupling said externally toothed member to a cooperating one of said valve elements to cause relative rotation between said valve elements responsive to said orbital movement of one of said toothed members, and one of said valve elements having means defining a by-pass duct for each inlet port allowing communication between the individual ports and the fluid passages upon relative movement of said valve elements effective to allow flow of a small quantity of pressure fluid between the ports and passages preliminarily to flow of a principal flow therebetween, and flow of said small quantity being effective to preclude pressure surges of fluid in said passages.

13. In a fluid pressure device, an internally toothed member defining the outer wall of a chamber, a cooperating externally toothed member having a less number of teeth than the internally toothed member and disposed eccentric thereof in said chamber in meshing engagement therewith, one of said members moving in an orbit about the axis of the other thereof during relative rotation between said members, valve means including cooperating relatively movable valve elements one of which is operatively coupled to said internally toothed member and which defines fluid passages in communication with said chamber, another of said valve elements defining fluid passages communicating with different ones of the fluid passages in said one of the valve elements upon relative rotation therebetween, said valve means defining inlet and outlet ports communicating with different ones of said fluid passages and adapted to be coupled to a source of fluid, means operatively coupling said externally toothed member to a cooperating one of said valve elements to cause relative movement between said valve elements responsive to said relative orbital movement between said toothed members, and one of said valve elements having means defining a by-pass duct for each inlet port allowing communication between the individual ports and the fluid passages upon relative movement of said valve elements effective to allow flow of a small quantity of pressure fluid between the ports and passages preliminarily to flow of a principal flow therebetween, and flow of said small quantity being effective to preclude pressure surges of fluid in said passages.

References Cited

UNITED STATES PATENTS

| | | | |
|---|---|---|---|
| 2,984,215 | 5/1961 | Charlson | 91—56 |
| 3,261,235 | 7/1966 | Henkel | 91—56 X |
| 3,270,683 | 9/1966 | McDermott | 103—130 |
| 3,289,542 | 12/1966 | Fiske | 91—56 |
| 3,381,498 | 5/1968 | McDermott | 91—56 X |

EVERETTE A. POWELL, JR., Primary Examiner

U.S. Cl. X.R.

103—130